US008146018B2

(12) United States Patent
Shimura et al.

(10) Patent No.: US 8,146,018 B2
(45) Date of Patent: Mar. 27, 2012

(54) GESTURE-BASED CONTROL OF MULTIPLE GAME CHARACTERS AND OTHER ANIMATED OBJECTS

(75) Inventors: Yukimi Shimura, Redmond, WA (US);
Yoonjoon Lee, Redmomd, WA (US);
Stephen Lee, Redmond, WA (US)

(73) Assignee: Nintendo Co., Ltd., Kyoto (JP)

( * ) Notice: Subject to any disclaimer, the term of this patent is extended or adjusted under 35 U.S.C. 154(b) by 1531 days.

(21) Appl. No.: 11/464,227

(22) Filed: Aug. 14, 2006

(65) Prior Publication Data
US 2007/0265082 A1 Nov. 15, 2007

Related U.S. Application Data

(60) Provisional application No. 60/745,893, filed on Apr. 28, 2006.

(51) Int. Cl.
*G06F 3/14* (2006.01)
(52) U.S. Cl. ......................................... 715/863; 463/37
(58) Field of Classification Search ....... 3/863; 715/863
See application file for complete search history.

(56) References Cited

U.S. PATENT DOCUMENTS

| | | | | |
|---|---|---|---|---|
| 4,355,805 A | * | 10/1982 | Baer et al. | 463/31 |
| 6,057,845 A | * | 5/2000 | Dupouy | 715/863 |
| 6,080,061 A | | 6/2000 | Watanabe et al. | |
| 6,267,676 B1 | | 7/2001 | Nagaoka | |
| 6,462,840 B1 | | 10/2002 | Kravtsov | |
| 6,597,345 B2 | | 7/2003 | Hirshberg | |
| 7,093,202 B2 | * | 8/2006 | Saund et al. | 715/863 |
| 2001/0006908 A1 | | 7/2001 | Fujioka et al. | |
| 2002/0067347 A1 | | 6/2002 | Maezawa et al. | |
| 2002/0137557 A1 | | 9/2002 | Ishii et al. | |
| 2005/0159223 A1 | | 7/2005 | Tahara et al. | |
| 2005/0176502 A1 | | 8/2005 | Nishimura et al. | |
| 2006/0019752 A1 | | 1/2006 | Ohta | |
| 2006/0258455 A1 | * | 11/2006 | Kando | 463/36 |

FOREIGN PATENT DOCUMENTS

| | | |
|---|---|---|
| JP | 06-230888 | 8/1994 |
| JP | 2002-123369 A | 4/2002 |
| JP | 2002-000939 A | 8/2002 |

OTHER PUBLICATIONS

Conflict Zone Instruction Manual, Ubi Soft Entertainment (2000).
Homeworld 2 Gameplay Guide, Sierra Entertainment Inc. (2003).
"Sea War Game," Palm Games, <http://web.archive.org/web/20010408062844/www.palmgames.com/seawar/index.htm> (Apr. 8, 2001).

(Continued)

*Primary Examiner* — Corbett B Coburn
(74) *Attorney, Agent, or Firm* — Nixon & Vanderhye P.C.

(57) ABSTRACT

Methods and apparatus for controlling movement of multiple independent animated objects such as characters displayed on a display use zone detection and touch stroke direction. A player wishing to move the digital objects can use a stylus or other touch to draw strokes or gestures on the screen. Different strokes can correspond to different types of control inputs. For example, based on where a stroke begins and ends on the screen relative to character position, different animated characters can be selected and controlled. Some strokes control only one animated character to move in a particular direction, whereas other strokes can control multiple objects to move in a coordinated manner.

8 Claims, 7 Drawing Sheets

OTHER PUBLICATIONS

"Touhou Project." Wikipedia, The Free Encyclopedia, <http://en.wikipedia.org/w/index.php?title=Touhou_Project&oldid=14342058~ (May 28, 2005).

Conflict Zone Instruction Manual, Ubi Soft Entertainment, pp. 14-15, 18-19, 22-23 (2000).

Homeworld 2 Gameplay Guide, Sierra Entertainment Inc., pp. 19-24, 49, 51, 68 (2003).

"Gateway 710X Performance—Specifications" Gateway Support, Gateway, Inc., <http://web.archive.org/web/20031105100254/products.gateway.com/products/GConfig/proddetails.asp?systemid=710xp&seg=hm> (Dec. 24, 2003).

"Viewsonic VG700b 17in LCD Black—Specifications" Gateway Support. , Gateway, Inc. <http://web.archive.org/web/20040312043938/accessories.gateway.com/AccessoryStore/PC+Accessories_316441/Monitors_31 6684/LCD+_Q1_Flat+Panel_Q1_+Monitors_316694/15_D1_17+inch+LCD_381953/2440381_proddetail.htm?ref+merch> (Dec. 24, 2003).

"Game.com" Vidgame.net, Vidgame.net, <http://web.archive.org/web/20030626035028/http://www.vidgame.net/ TIGER/GC.html> (Jun. 26, 2003).

"Palm Games news," Palm Games. Apr. 1, 2001. Internet Archive, <http://web.archive.org/web/2001033101271 1/ www.palm-games.com/news.htm> (Jul. 17, 2008).

"Games List," Palm Games. Apr. 1, 2001. Internet Archive. <http://web.archive.org/web/20010331043209/www.palm-games.com/index. html (Jul. 17, 2008).

"Sea War Game," Palm Games. Apr. 1, 2001. Internet Archive. <http://web.archive.org/web/20010408062844/www.palm-games.com/seawar/index.htm> (Jul. 17, 2008).

Provinciano, Brian, "The Tiger Game.com Handheld & Reverse Engineering" Brian Provinciano's—The Low Level, <http://bripro.com/lowlgamecom/index.php> (Jan. 16, 2005).

Provinciano, Brian, "Tiger Game.com—Game Screen Shots (p. 3 of 4)" Brian Provinciano's—The Low Level. <http://bripro.com/low/gamecom/index.php?page=games3> (Jan. 16, 2005).

"Duke Nukem 3d Instruction Manual for Sega Saturn", 3D Realms (1997).

Sterbakov, Hugh. "Mortal Kombat Trilogy for Playstation Review" Gamespot, <http://www.gamespot.com/ps/action/ mortalkombattrilogy/review.html?sid=2548427&print=1> (Dec. 1, 1996).

"Resident Evil 2: Differences FAQ," IGN Entertainment Games, <http://faqs.ign.com/articles/378/378659p1.html> (Aug. 18, 2002.).

Norman, Donald A., "The Design of Everyday Things," 2002 Edition, pp. 81-217 (2002).

* cited by examiner

*Fig. 1A*
Exemplary Illustrative
Game Play Platform

Fig. 1B
Exemplary Illustrative
Game Play Platform
Block Diagram

Fig. 2
*Exemplary Illustrative Game Character Definition*

GESTURE-BASED CONTROL OF MULTIPLE GAME CHARACTERS AND OTHER ANIMATED OBJECTS

CROSS-REFERENCES TO RELATED APPLICATIONS

This application is a nonprovisional application claiming the benefit of priority from application No. 60/745,893 filed on Apr. 28, 2006 and entitled "Gesture-Based Control of Multiple Game Characters and Other Animated Objects", incorporated herein by reference as if expressly set forth. This application is related to commonly assigned copending application Ser. No. 11/464,221 filed on Aug. 14, 2006 and entitled "Touch-Controlled Game Character Motion Providing Dynamically-Positioned Virtual Control Pad", incorporated herein by reference as if expressly set forth.

STATEMENT REGARDING FEDERALLY SPONSORED RESEARCH OR DEVELOPMENT

None.

FIELD

The technology herein relates to control of a digital object in a virtual gamespace. More specifically, the technology herein relates to video game user interfaces using touch screens, and to control of digital objects such as animated characters in a virtual gamespace using touch.

BACKGROUND AND SUMMARY

Portable, handheld video game systems are popular among people of all ages. Some examples of these systems include Nintendo GameBoy® and Nintendo GameBoy Advance®. With the advent of touch screens, the player can now interact with the game screen using a stylus.

Handheld portable computing systems which use a touch screen and stylus have existed in the past, but these systems have generally been directed at data storage and organization. While basic games have been developed for such systems, games nearing the magnitude and scope of typical portable handheld gaming have generally not been available in the past. People using these stylus controlled systems have generally used them for business and time management, not as video game systems.

Even though stylus based portable devices exist, additional improvements allowing the player to experience the benefits a stylus could provide in a video game system would be beneficial. Needs exist for stylus based control that are as easy to use as joystick control of a digital object in a virtual gamespace.

One area of interest relates to control of multiple, independently movable objects displayed on the screen. Suppose for example that two different animated cartoon characters or other objects are displayed as part of a game or other video display. Each of these animated objects can move independently. They may also be able to interact with one another or otherwise move together in a coordinated fashion.

In a multiplayer context, it is possible to assign different players to control different characters. For example, a first human player can control a first animated character, a second human player can control a second animated character, and so on. A single player mode or game presents a different challenge. Sometimes the computer can control one object while the human player controls another object. But sometimes it might be desirable for a single human player to be able to control or otherwise influence the actions of both animated characters.

One possible approach would be to provide different joysticks for the different characters. For example, one joystick could be assigned to control one character, and another joystick could be assigned to control another character. However, this type of arrangement may not be possible or practical in the context of scaled-down gaming platforms such as portable or handheld videogame systems. In such systems having a minimal number of controls, it may be a challenge to allow a player to control multiple, independently movable objects on the screen.

The exemplary illustrative non-limiting implementations herein provide methods and apparatus for controlling movement of a plurality of digital displayed objects. The digital objects may be any digital objects, such as animated game characters. A player wishing to move the digital objects can use a stylus or other touch to draw strokes or gestures on the screen. Different strokes can specify different types of control inputs. For example, based on where a stroke begins and ends on the screen relative to character position, different animated character actions can be selected and controlled. Some strokes control only one animated character to move in a particular direction, whereas other strokes can control multiple objects to move in a coordinated manner.

The exemplary illustrative non-limiting implementations allow a player to manipulate game objects in a flexible fashion. The player feels as if he is directly manipulating the game objects and so has a close connection to the game experience.

BRIEF DESCRIPTION OF THE DRAWINGS

These and other features and advantages will be better and more completely understood by referring to the following detailed description of exemplary non-limiting illustrative embodiments in conjunction with the drawings, of which.

DETAILED DESCRIPTION

Exemplary Illustrative Touch Screen Based Game Play Platform

Figure 1A:
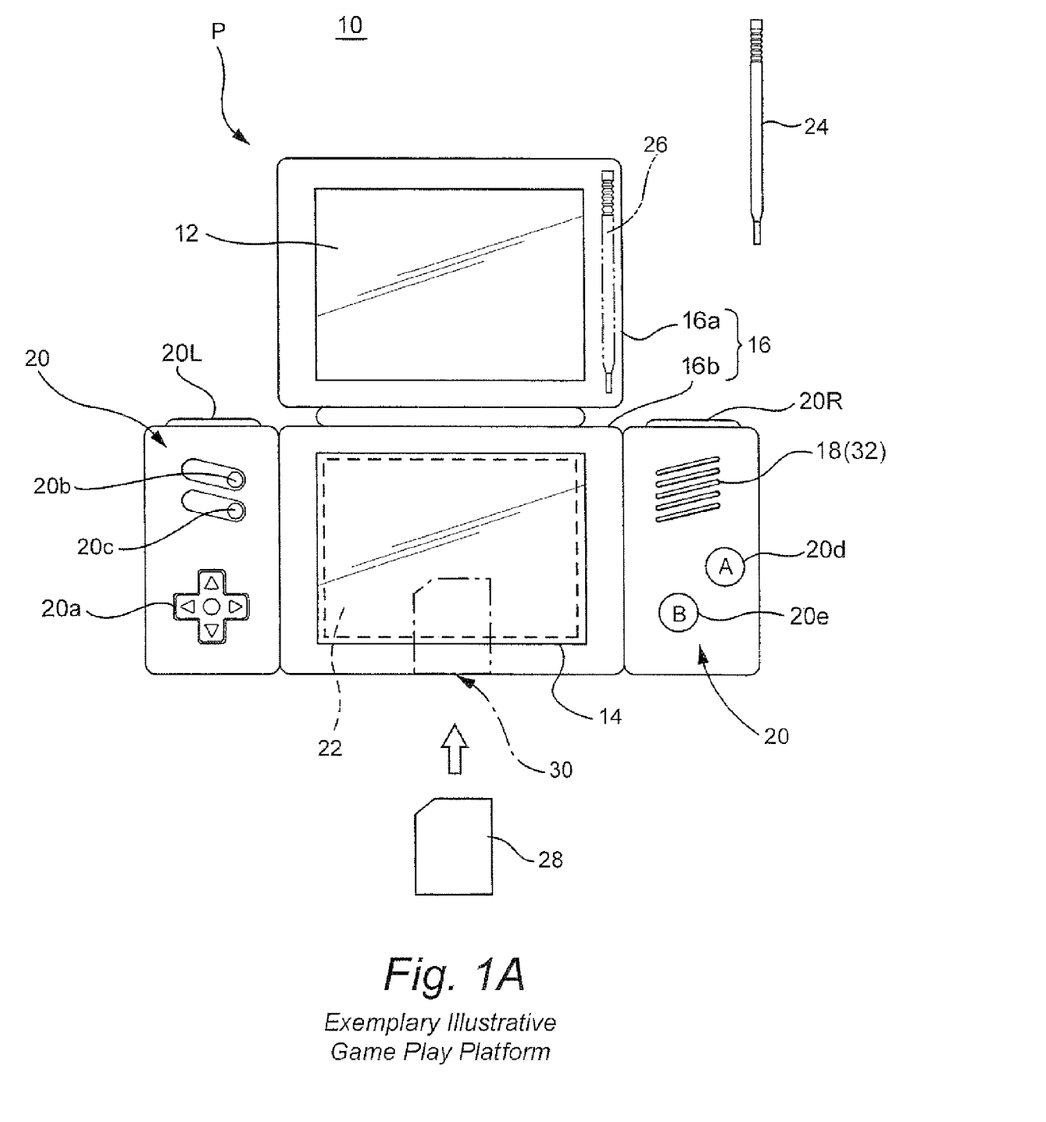
FIG. 1A is an exemplary external view of an exemplary illustrative non-limiting implementation of a game apparatus for executing a game program providing stylus-based object control.

Referring to FIG. 1A, a game device P of one exemplary illustrative non-limiting implementation includes a first liquid crystal display (LCD) 12 and a second LCD 14. The LCD 12 and the LCD 14 are provided on a housing 16 so as to be arranged in a predetermined position. In this implementation, the housing 16 consists of an upper housing 16a and a lower housing 16b, and the LCD 12 is provided on the upper housing 16a while the LCD 14 is provided on the lower housing 16b. Accordingly, the LCD 12 and the LCD 14 are closely arranged so as to be longitudinally (vertically) parallel with each other.

It is noted that although the LCD is used as a display in this implementation, an EL (Electro-Luminescence) display or a plasma display may be used in place of the LCD. Alternatively, a CRT display may be used for game consoles, arcade video game machines, etc.

As can be understood from FIG. 1A, the upper housing 16a has a planar shape a little larger than a planar shape of the LCD 12, and has an opening formed so as to expose a display surface of the LCD 12 from one main surface thereof. The lower housing 16b has a planar shape horizontally longer than the upper housing 16a, and has an opening formed so as to expose a display surface of the LCD 14 at an approximately center of the horizontal direction. Furthermore, the lower housing 16b is provided with a sound hole 18 and an operating switch 20 (20a, 20b, 20c, 20d, 20e, 20L and 20R).

The upper housing 16a and the lower housing 16b are rotatably connected at a lower side (lower edge) of the upper housing 16a and a part of an upper side (upper edge) of the lower housing 16b. Accordingly, in a case of not playing a game, for example, if the upper housing 16a is rotatably folded such that the display surface of the LCD 12 and the display surface of the LCD 14 are face to face with each other, it is possible to prevent the display surface of the LCD 12 and the display surface of the LCD 14 from being damaged. The upper housing 16a and the lower housing 16b are not necessarily rotatably connected with each other, and may alternatively be provided integrally (fixedly) to form the housing 16.

The operating switch 20 includes a direction instructing switch (cross switch) 20a, a start switch 20b, a select switch 20c, an action switch (A button) 20d, an action switch (B button) 20e, an action switch (L button) 20L, and an action switch (R button) 20R. The switches 20a, 20b and 20c are placed at the left of the LCD 14 on the one main surface of the lower housing 16b. The switches 20d and 20e are placed at the right of the LCD 14 on the one main surface of the lower housing 16b. Switches 20L and 20R are placed in a part of an upper edge (top surface) of the lower housing 16b and lie on each side of the connected portion with the upper housing 16a.

The direction instructing switch 20a functions as a digital joystick, and is used for instructing a moving direction of a player character (or player object) to be operated by a player, instructing a moving direction of a cursor, and so forth by operating any one of four depression portions. The start switch 20b is formed by a push button, and is used for starting (restarting) a game, temporarily stopping (pausing) a game, and so forth. The select switch 20c is formed by the push button, and used for a game mode selection, etc.

The action switch 20d (that is, the A button) is formed by the push button, and allows the player character to perform an action that is game specific. For example, it may be used for instructing character movement direction, such as hitting (punching), throwing, holding (obtaining), riding, jumping, etc. For example, in an action game, it is possible to apply an instruction of jumping, punching, moving arms, etc. In a role-playing game (RPG) or a simulation RPG, it is possible to apply an instruction of obtaining an item, selecting and determining acts or commands, etc. The action switch 20e (that is, the B button) is provided by a push button, and is used for changing a game mode selected by the select switch 20c, canceling an action determined by the A button 20d, and so forth.

The action switch (left depression button) 20L and the action switch (right depression button) 20R are formed by a push button. The left depression button (L button) 20L and the right depression button (R button) 20R can perform the same operation as the A button 20d and the B button 20e, and also function as a subsidiary of the A button 20d and the B button 20e.

A touch panel 22 is provided on a top surface of the LCD 14. As the touch panel 22, any type of a resistance film system, an optical system (infrared rays system) or an electrostatic capacitive coupling system, for example, can be used. In response to an operation of depressing, stroking or touching with a stick 24, a pen (stylus pen), or a finger (hereinafter, referred to as "stick 24, etc.") on a top surface (detection surface) of the touch panel 22, the touch panel 22 detects coordinates of operating position of the stick 24, etc. and outputs coordinate data corresponding to the detected coordinates.

According to this implementation, the exemplary non-limiting resolution of the display surface of the LCD 14 is 256 dots×192 dots, and a detection accuracy of a detection surface of the touch panel 22 is also rendered 256 dots×192 dots in correspondence to the resolution of the display surface (this is the same or approximately the same as for the LCD 12). Detection accuracy of the detection surface of the touch panel 22, however, may be lower than the resolution of the display surface of the LCD 14, or higher than it. In the detected coordinates of the touch panel 22, a point of origin (0, 0) is on an upper left corner, a right horizontal direction is an X-axis normal direction and a downward vertical direction is a Y-axis normal direction (the same applies to the coordinate system of the LCD 14 (12)). A three-dimensional game space often has X and Y coordinates on the horizontal plane and a Z axis in a vertical direction.

It is possible to display different game images (game screens) on the LCD 12 and the LCD 14. This allows the player to point at (specify) or make active (move) character images displayed on the screen of the LCD 14, such as player characters, enemy characters, item characters, text information and icons, or select a command, by operating the touch panel 22 with the stick 24, etc. This also makes it possible to change an orientation of a virtual camera (viewpoint) provided in the three-dimensional game space or scroll through a game screen (the screen is displayed in a state of being gradually moved).

As stated above, the game device 10 has the LCD 12 and the LCD 14 as a display portion of two screens, and by providing the touch panel 22 on an upper surface of any one of them (LCD 14 in the first embodiment), the game device 10 has the two screens (LCD 12, 14) and the two operating portions (20, 22).

Additionally, in this implementation, the stick 24 can be inserted into a housing portion (housing slot) 26 provided in proximity to a side surface (right side surface) of the upper housing 16a, for example, and taken out therefrom as necessary. In a case of providing no stick 24, it is not necessary to provide the housing portion 26.

The game device 10 further includes a memory card (or game cartridge) 28. The memory card 28 is detachable, and inserted into a loading slot 30 provided on a rear surface or a lower edge (bottom surface) of the lower housing 16b. Although omitted in FIG. 1A, a connector 46 (see FIG. 1B) is provided at a depth portion of the loading slot 30 for connecting a connector (not shown) provided at an end portion of the memory card 28 in the loading direction. When the memory card 28 is loaded into the loading slot 30, the connectors are connected with each other, and therefore, the memory card 28 is accessible by a CPU core 42 (see FIG. 1B) of the game device 10.

A speaker 32 (see FIG. 1B) is provided at a position corresponding to the sound hole 18 inside the lower housing 16b. A battery accommodating box is provided on a rear surface of the lower housing 16b, and a power switch, a volume switch, an external expansion connector, an earphone jack, etc. are provided on a bottom surface of the lower housing 16b.

Figure 1B:
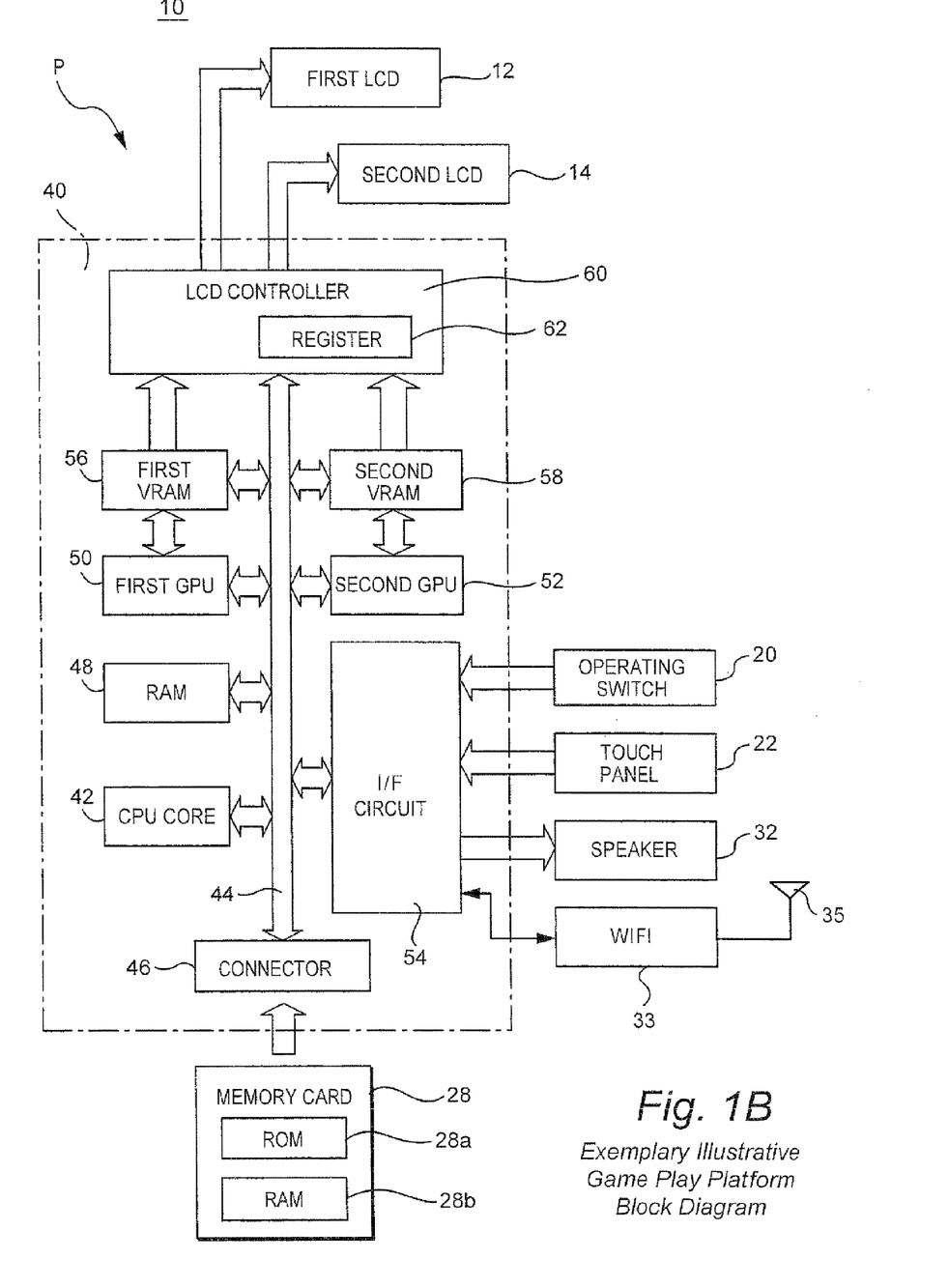
FIG. 1B is a block diagram showing an exemplary illustrative internal structure of the game apparatus.

FIG. 1B is a block diagram showing an exemplary illustrative non-limiting electric configuration of the game device 10. Referring to FIG. 1B, the game device 10 includes an electronic circuit board 40, and on the electronic circuit board 40, a circuit component such as a CPU core 42, etc. is mounted. The CPU core 42 is connected to the connector 46 via a bus 44, and is connected with a RAM 48, a first graphics processing unit (GPU) 50, a second GPU 52, an input-output interface circuit (hereinafter, referred to as "I/F circuit") 54, and an LCD controller 60.

The connector 46 is detachably connected with the memory card 28 as described above. The memory card 28 includes a ROM 28a and a RAM 28b. The ROM 28a and the RAM 28b are connected with each other via a bus and also connected with a connector (not shown) to be connected with the connector 46. Accordingly, the CPU core 42 gains access to the ROM 28a and the RAM 28b as described above.

The ROM 28a stores in advance a game program for a virtual game to be executed by the game device 10. ROM 28a may also store image data (character image, background image, item image, icon (button) image, message image, etc.), data representing sounds or music used to accompany the game (sound data), etc. The RAM (backup RAM) 28b stores (saves) proceeding data and result data of the game.

The RAM 48 is used as a buffer memory or a working memory. The CPU core 42 loads the game program, the image data, the sound data, etc. stored in the ROM 28a of the memory card 28 into the RAM 48, and executes the loaded game program. The CPU core 42 executes a game process while storing in the RAM 48 data (game data and flag data) temporarily generated in correspondence with progress of the game.

The game program, the image data, the sound data, etc. are loaded from the ROM 28a entirely at a time, or partially and sequentially so as to be stored (loaded) into the RAM 48.

Each of the GPU 50 and the GPU 52 forms a part of a rendering means. They may be provided by, for example, a single chip ASIC. GPU 50, 52 receive graphics commands from the CPU core 42 to generate game image data according to the graphics command. The CPU core 42 provides each of the GPU 50 and the GPU 52 with an image generating program (included in the game program) used to generate the game image data in addition to the graphics command.

GPU 50 is connected with a first video RAM (hereinafter, referred to as "VRAM") 56. GPU 52 is connected with a second VRAM 58. The GPU 50 and the GPU 52 obtain data required for the GPU 50 and the GPU 52 to execute the graphics command (image data: character data, texture data, etc.) by access to a first VRAM 56 and a second VRAM 58, respectively. The CPU core 42 writes the image data required for graphics drawing into the first VRAM 56 and the second VRAM 58 via the GPU 50 and the GPU 52. The GPU 50 accesses the VRAM 56 to generate the game image data for graphics drawing. GPU 52 accesses the VRAM 58 to generate the game image data for graphics drawing.

The VRAM 56 and the VRAM 58 are connected to the LCD controller 60. The LCD controller 60 includes a register 62. Register 62 consists of, for example, one bit. Register 62 stores a value of "0" or "1" (data value) according to an instruction of the CPU core 42. When the data value of the register 62 is "0", the LCD controller 60 outputs the game image data generated by the GPU 50 to the LCD 12, and outputs the game image data generated by the GPU 52 to the LCD 14. When the data value of the register 62 is "1", the LCD controller 60 outputs the game image data generated by the GPU 50 to the LCD 14, and outputs the game image data generated by the GPU 52 to the LCD 12.

The LCD controller 60 reads out game image data directly from the VRAM 56 and the VRAM 58, and reads out game image data from the VRAM 56 and the VRAM 58 via the GPU 50 and the GPU 52.

The I/F circuit 54 is connected with the operating switch 20, the touch panel 22 and the speaker 32. Operating switch 20 is the above-described switches 20a, 20b, 20c, 20d, 20e, 20L and 20R. In response to an operation of the operating switch 20, a corresponding operation signal (operation data) is input to the CPU core 42 via the I/F circuit 54. The coordinates position data from the touch panel 22 is input to the CPU core 42 via the I/F circuit 54. The CPU core 42 reads-out the sound data necessary for the game such as a game music (BGM), a sound effect or voices of a game character (onomatopoeic sound), etc. from the RAM 48, and outputs it from the speaker 32 via the I/F circuit 54.

FIG. 1B further shows a "Wi-Fi" wireless adapter 33 and associated antenna 35. Wi-Fi wireless adapter 33 comprises a transceiver (transmitter and receiver) that allows gaming platform P to communicate wirelessly via network N. Wi-Fi wireless adapter 33 may comprise for example a baseband system, modulator and amplifiers compliant with the conventional 802.11 standard. Wi-Fi wireless adapter 33 wirelessly receives information transmitted over RF from other devices, and wirelessly sends information to other devices. Other wired or wireless technology (e.g., Ethernet, WAN, Bluetooth, etc.) could be substituted. Wireless adapter 33 allows gaming platform P to communicate with other gaming platforms or other devices in the same room or vicinity and/or with more remote devices. Network N could be a very localized network such as a 20-meter range WI-FI ad hoc connection, or it could be a worldwide network such as the Internet, or any other wired or wireless network you can think of.

Exemplary Illustrative Non-Limiting Multiple Character Control

Figure 2:
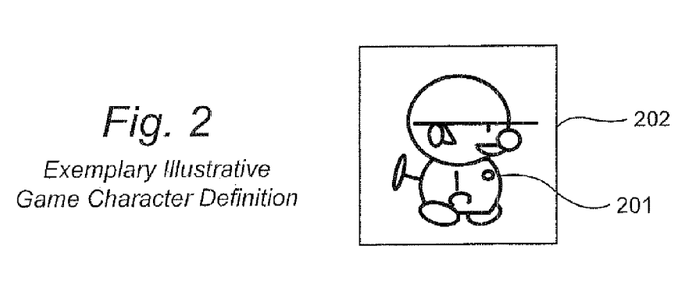
FIG. 2 shows an exemplary illustrative non-limiting movable game character.

In one exemplary illustrative non-limiting implementation shown in FIG. 2, a game character 201 is provided for display on one of displays 12, 14. A selection area or bounding box 202 ("stylus detector") is provided around the game character. The game character may be 2D or 3D and may be defined and rendered using any known graphics technique. The size of the selection area 202 can be any size, up to and including the size of the actual game screen or beyond, but in this exemplary illustrative non-limiting implementation the area 202 is a box or rectangle that is only slightly larger than the character 201.

In the exemplary illustrative implementation, the selection area 202 is used to detect whether a touch on touch screen 13 pertains to the game character 201 or not. Touches by stylus 16 or otherwise within the selection area 202 area are interpreted to be relevant to the motion of game character 201, whereas touches outside of this bounding box are determined not to be relevant to the motion of game character 201. While a rectangle is shown as the shape of the area 202 in this exemplary illustrative non-limiting implementation, the selection area 202 may be of any suitable shape such as a polygon, a circle or any other shape. Exemplary size of the stylus detector box can be for example 32×28 pixels. The same or different (e.g., smaller) bounding box can be used for collision detection in generating animation effects.

Moving Two Characters in the Same Direction

Figure 2A:
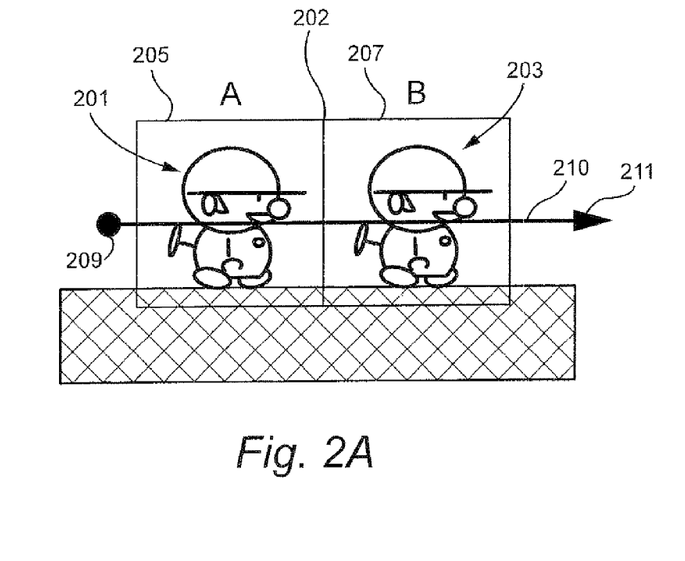
FIGS. 2A and 2B show an exemplary illustrative non-limiting implementation of two animated game characters or other objects controlled by a common stroke or gesture.
Figure 2B:
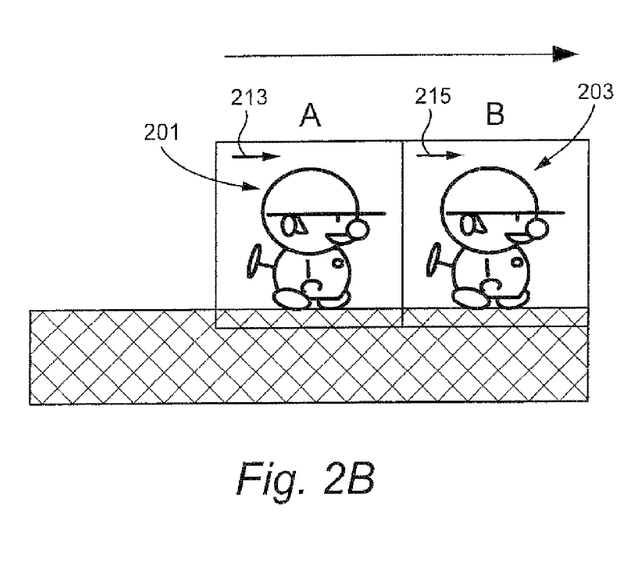

FIGS. 2A and 2B show an exemplary illustrative non-limiting implementation of two animated game characters or other objects 201, 203 with associated stylus detection boxes 205, 207. In this example, stylus detection boxes 205, 207 are adjacent one another, and used in conjunction with one another to control animated character movement.

In the scenario shown in FIGS. 2A and 2B, the game player wishes to cause both of animated characters 201, 203 to begin moving to the right. To accomplish this result, the player can place the stylus down at a point 209 which is to the left of the left-most character 201, and then draw a rightward stroke or gesture through both characters 201, 203 along the path 210 as shown. In this instance, the stylus can have an initial position that is to the left of character 201's stylus detection box 205 by a predetermined distance (e.g., 17 pixels or more from the centroid of character 201 and/or from the center of the character's associated stylus detection box 205). Upon placing the stylus down at such a starting or "stylus down" position and moving it rightwards in contact with the touch screen through both characters 201, 203, both characters begin moving to the right in an animated fashion (see FIG. 2B). The same situation could apply to move both characters leftward.

Figure 3A:
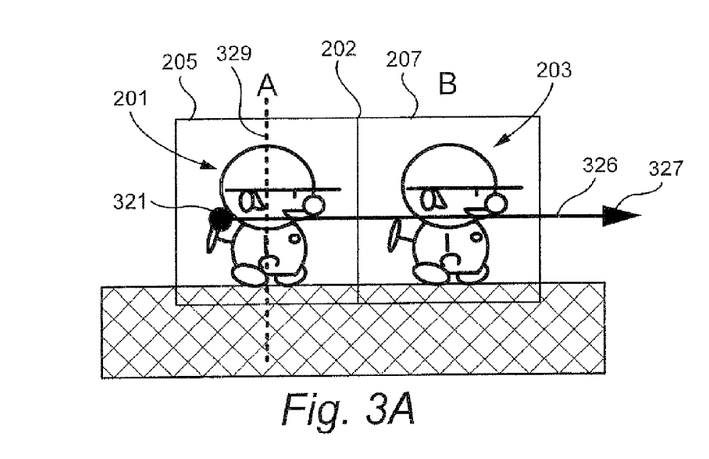
FIGS. 3A and 3B show an exemplary representation of two game characters in a gamespace, both game characters having moved in the rightward direction.
Figure 3B:
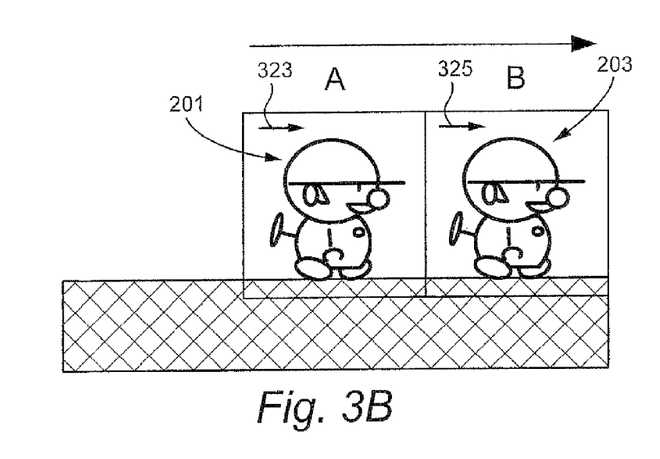

FIG. 3A shows an exemplary representation of the same or different two animated game characters or other objects in a gamespace. Once again, first game character 201 is positioned to the left of a second game character 203, and detection areas 205, 207 of both game characters share an adjacent detection sidewall 202 in this example. In one exemplary illustrative non-limiting implementation, touch is placed at a point 321 on the screen within the leftmost character's 201 detection area 205, but left of the centerline 329 of the character 201 (e.g., the vertical line dissecting the stylus detection box 205 associated with that character). In this implementation, the touch is at least a predetermined distance (e.g., 5 pixels or more) to the left of the centerline 329 of the character 201. The touch is then moved along a rightward path 326 out of the leftmost character's 201 detection area 205 and through the rightmost character's 203 detection area 207. This operation also causes both characters 201, 203 to move in a rightward direction, as shown in FIG. 3B by movement arrows 323, 325. Depending on a particular implementation, any suitable selection and action may result from applying the indicated stylus movements to characters in the indicated positions.

Moving Only One Character

Figure 4A:
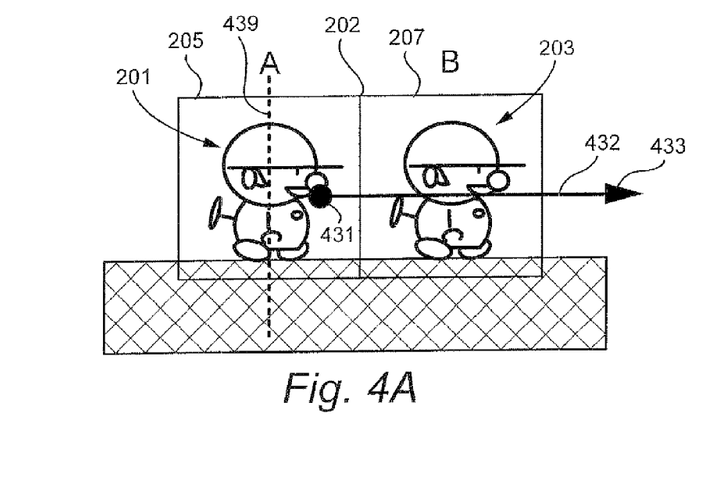
FIGS. 4A and 4B show an exemplary representation of two game characters in a gamespace, the rightmost game character having moved in the rightward direction.
Figure 4B:
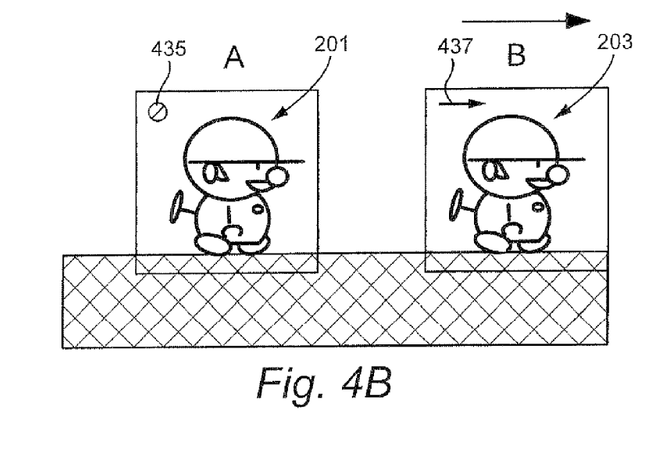

Now suppose the game player wants only the rightmost character to begin moving to the right. FIG. 4A shows another exemplary representation of the same or different two game characters in a gamespace. The first game character 201 is positioned to the left of a second game character 203, and detection areas 205, 207 of both game characters share an adjacent detection sidewall 202. In this further exemplary illustrative non-limiting implementation, touch is placed at a point 431 on the screen within the leftmost character's 201 detection area 205, but at least a certain distance (e.g., 5 pixels or more) to the right of the centerline 439 of the character 201. The touch is then moved along a rightward path 432 out of detection area 205 and through detection area 207. This operation causes the rightmost character 203 to move in a rightward direction, as shown in FIG. 4B by movement arrow 437. However, the leftmost character remains in its previous position as shown by the no-action ("no change") symbol 435. Depending on a particular implementation, any suitable selection and action may result from applying the indicated touch movements to characters in the indicated positions. Note that in the exemplary illustrative implementation, stylus detection begins from the centerline of the bounding boxes 203, 205 to provide reliable detection if bounding box size changes.

Figure 5A:
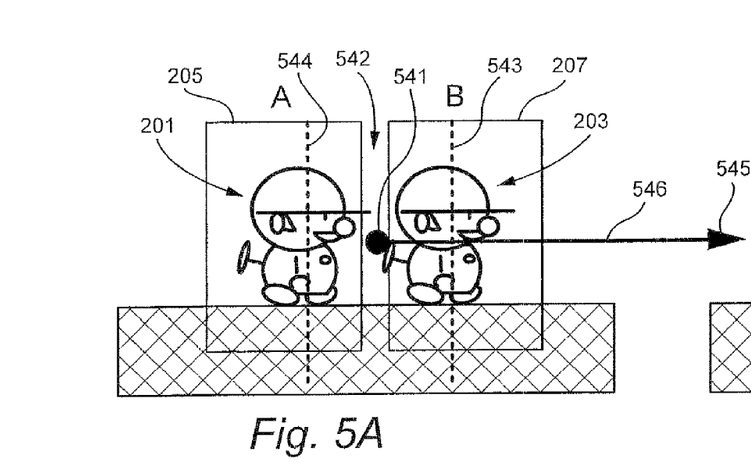
FIGS. 5A and 5B show an exemplary representation of two game characters in a gamespace, the rightmost game character having moved in the rightward direction.
Figure 5B:
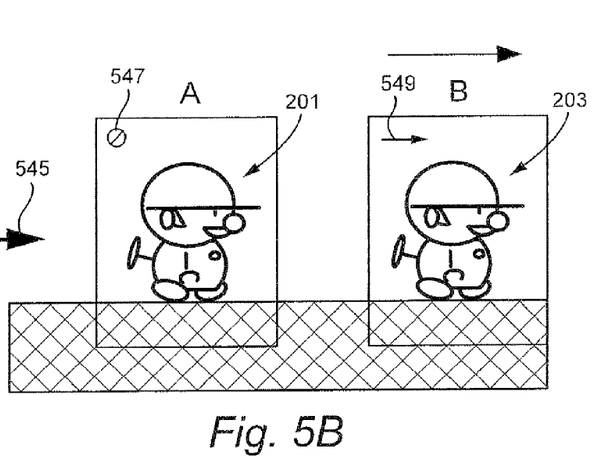

FIG. 5A shows another example of two game characters in a gamespace that are more closely spaced than in the FIG. 4A, 4B example. A first game character 201 is positioned to the left of a second game character 203, but detection areas 205, 207 of the two game characters overlap to create an overlap area 542 (in this particular example, the characters are not close enough to one another to create a collision detection situation). In a further exemplary illustrative non-limiting implementation, touch is placed at a point 541 on the screen within the overlap area 542, making the starting point within both detection areas 205, 207. In this implementation, although the touch is in the overlap area 542, if the initial point 541 is closer to the centerline 543 of the rightmost character 203 than the centerline 544 of the leftmost character 201, and the touch is then moved along a rightward path 546 out of detection area 205 and through detection area 207, this operation causes only the rightmost character 203 to move in a rightward direction, as shown in FIG. 5B by movement arrow 549. The leftmost character remains in its previous position as shown by the no-action symbol 547. Depending on a particular implementation, any suitable selection and action may result from applying the indicated touch movements to characters in the indicated positions.

Figure 6A:
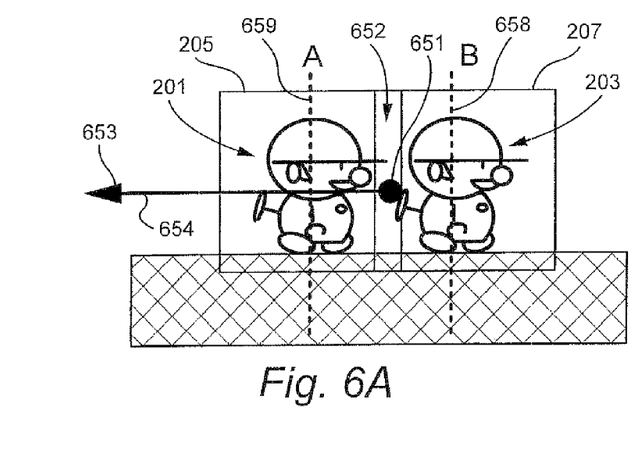
FIGS. 6A and 6B show an exemplary representation of two game characters in a gamespace, the leftmost game character having moved in the leftward direction.
Figure 6B:
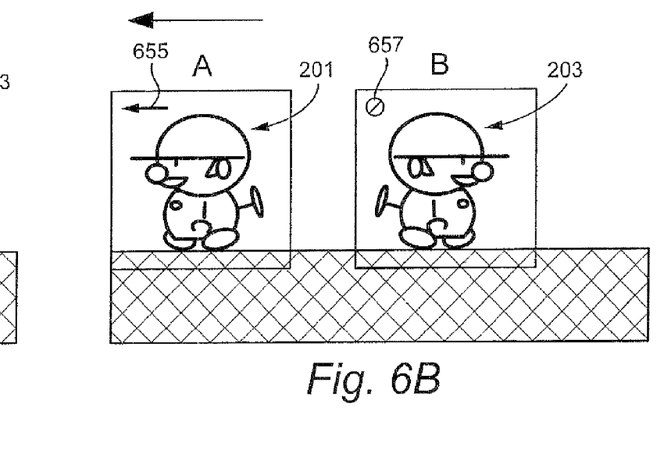

Now suppose the game player wants to cause the leftmost character to begin moving to the left. FIG. 6A shows another exemplary representation of two game characters in a gamespace. A first game character 201 is positioned to the left of a second game character 203, and detection areas 205, 207 of both game characters overlap creating an overlap area 652. In this further exemplary illustrative non-limiting implementation, touch is placed at a point 651 on the screen within the overlap area 652, making the starting point within both detection areas 205, 207. In this implementation, although the touch is in the overlap area 652, assume the initial point 651 is closer to the centerline 659 of the leftmost character 201 than the centerline 658 of the rightmost character 203. If the touch is then moved along a leftward path 654 out of detection area 207 and through detection area 205 to a point 653 left of the leftmost character's 201 detection area 205, this operation causes the leftmost character 201 to flip left and begin moving in a leftward direction, as shown in FIG. 6B by movement arrow 655. The rightmost character remains in its previous position or state (e.g., stopped or moving to the right) as shown by the no-change symbol 657. Depending on a particular implementation, any suitable selection and action may result from applying the indicated touch movements to characters in the indicated positions.

Figure 7A:
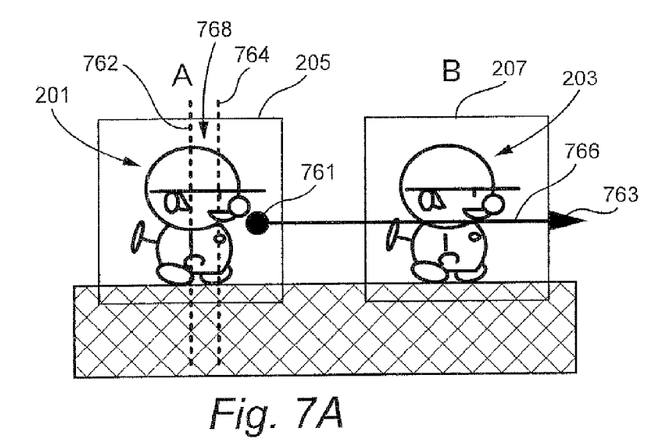
FIGS. 7A and 7B show an exemplary representation of two game characters in a gamespace, the rightmost game character having moved in the rightward direction.
Figure 7B:
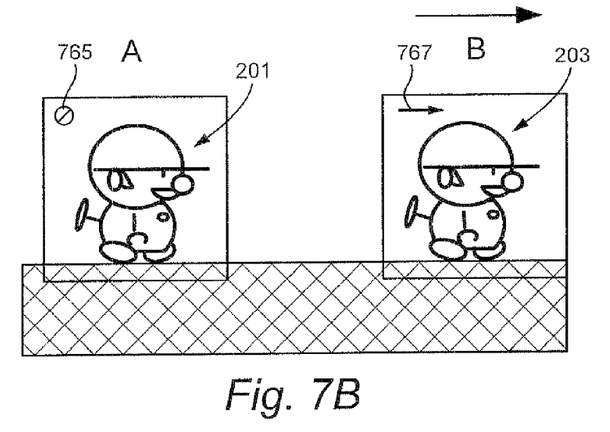

Suppose now the game player again wants to cause only the rightmost character to move to the right. FIG. 7A shows another exemplary representation of two game characters in a gamespace. A first game character 201 is positioned to the left of a second game character 203, and detection areas 205, 207 do not contact one another. In this further exemplary illustrative non-limiting implementation, touch is placed at a point 761 on the screen within the leftmost character's 201 detection area 205. The point 761, however, is outside the area 768 defined between the centerline 762 and a predetermined position 764 (e.g., more than 5 pixels to the right). The touch is then moved along a rightward path 766 out of detection area 205 and through detection area 207 to a point 763 right of the rightmost character's 203 detection area 207. This operation causes the rightmost character 203 to begin moving in a rightward direction, as shown in FIG. 7B by movement arrow 767. The leftmost character remains in its previous position or state as shown by the no-action symbol 765. Depending on a particular implementation, any suitable selection and action may result from applying the indicated stylus movements to characters in the indicated positions.

Figure 8A:
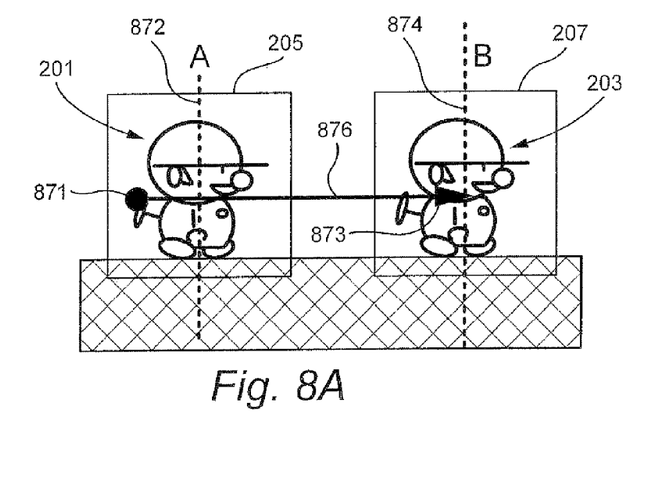
FIGS. 8A and 8B shows an exemplary representation of two game characters in a gamespace, the leftmost game character having moved in the rightward direction.
Figure 8B:
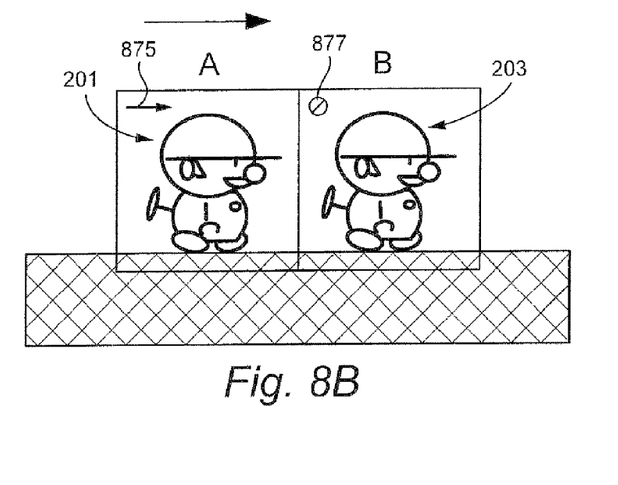

FIG. 8A shows another exemplary representation of two game characters in a gamespace. A first game character 201 is positioned to the left of a second game character 203, but detection areas 205, 207 do not contact one other. In this further exemplary illustrative non-limiting implementation, a stylus is placed at a point 871 on the screen within the leftmost character's 201 detection area 205. The point 871 is left of the leftmost character's 201 centerline 872 by at least a predetermined distance (e.g., 5 pixels or more). The touch is then moved along a rightward path 876 out of detection area 205 and into detection area 207 to a point 873 left of the rightmost character's 203 centerline 874. In this implementation, as long as the stylus stops at a point 873 at least a predetermined distance (e.g., 5 pixels or more) to the left of the rightmost character's 203 centerline 874, then this operation causes only the leftmost character 201 to move in a rightward direction, as shown in FIG. 8B by movement arrow 875. The rightmost character remains in its previous position as shown by the no action symbol 877. Additionally, if the leftmost character 201 collides with the rightmost character 203, both characters 201, 203 may flip to face left and continue their movement. Alternatively, if the stroke is not stopped at least a predetermined distance (e.g., 5 pixels to the left) from the rightmost character's 203 centerline 874, the rightmost character may also be moved in the rightwards direction but instead stops a predetermined distance (e.g., 5 pixels) to the right of the rightmost character's centerline 874, then both characters 201, 203 may move to the right in tandem. Depending on a particular implementation, any suitable selection and action may result from applying the indicated stylus movements to characters in the indicated positions.

Exemplary Illustrative Non-Limiting Flowchart

Figure 9:
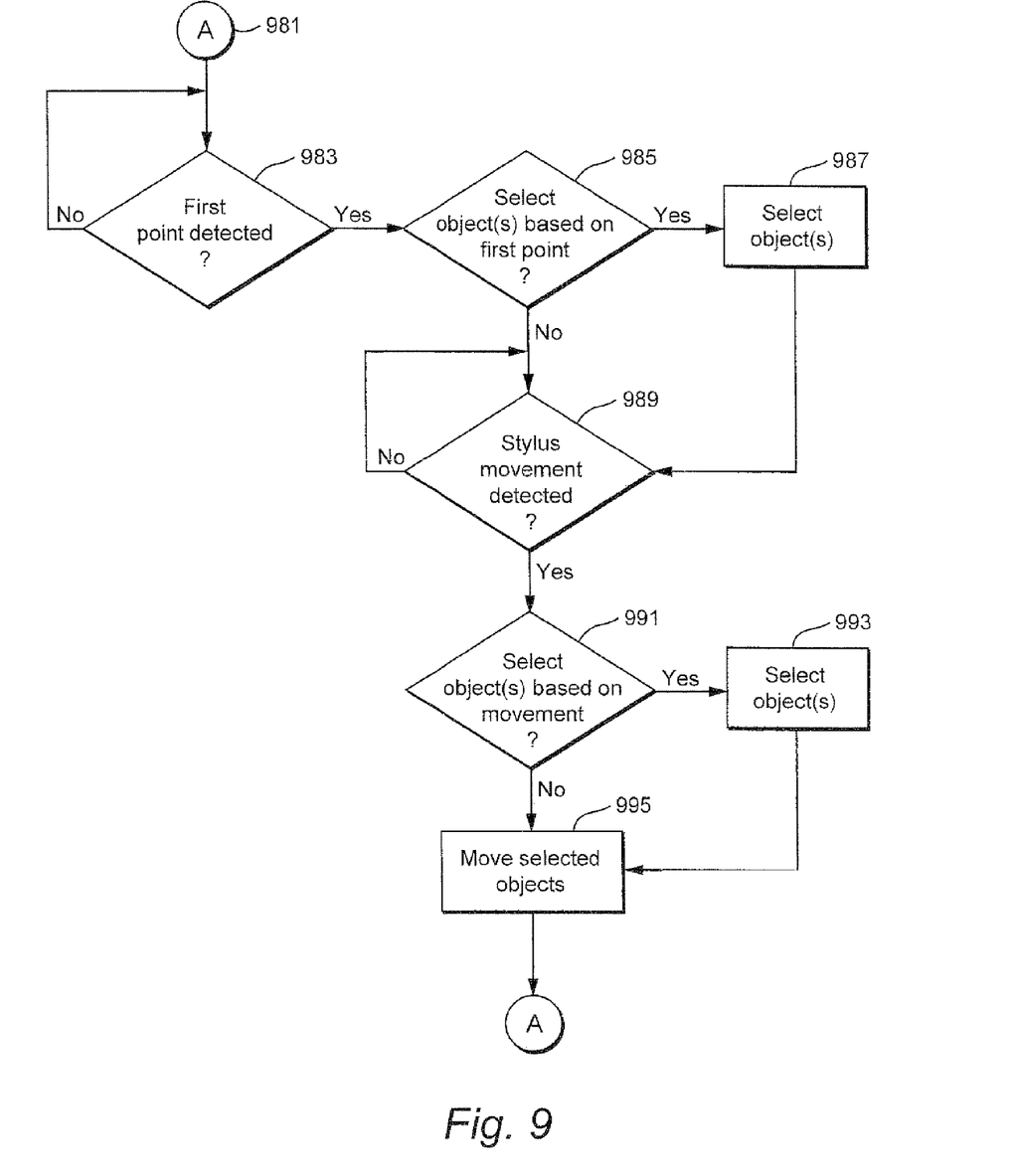
FIG. 9 shows a flowchart detailing an exemplary non-limiting process for object selection and movement.

FIG. 9 shows a flowchart detailing an exemplary illustrative non-limiting process for object selection and movement. Subroutine A 981 loops at a detection step 983 until a first "stylus down" or "stylus resting" point is detected. Then, at a first selection step 985, the subroutine determines whether at least one object should be selected based on the position of the first point. As explained above, in one non-limiting exemplary implementation, an object will be selected based on the position of the first point if the first point is within a certain proximity to a line dividing the object down the center.

If one or more objects are to be selected based on the first point, the subroutine selects them at a second selection step 987. Whether or not objects are selected, the subroutine next loops until stylus movement is detected at a movement detection step 989. Based on the movement, objects may be selected, so the subroutine checks to see if objects need to be selected in a third selection step 991. In a further non-limiting exemplary implementation, an object will be selected if the path of the stylus crosses the centerline of the object.

If objects are to be selected based on the path of the movement of the stylus, the subroutine then selects the one or more objects to be selected in fourth selection step 993. Whether or not objects were selected in step 993, the subroutine, in a movement step 995, then moves all selected objects in a direction determined based on the movement of the stylus While the technology herein has been described in terms of exemplary illustrative non-limiting implementations, it is understood that these implementations are provided by way of example only. For example, while a stylus contacting a touch screen is described above, strokes made using any other means (e.g., a finger on a touch pad, a handheld controller motion or a light pen tracing a path on a television screen, etc.) are also possible. While all the previous non-limiting exemplary implementations have been described with character orientation and movement in a particular direction, the directions may vary in different implementations. The invention is to be defined by the scope of the claims.

We claim:

1. A method of allowing a human user to control movement of plural displayed animated characters displayed on a display screen of a computing device in response to gestures manually inputted by a human player, the portable computing device comprising a CPU core connected to a memory, a display controller between the CPU core and the display screen, and an input/output controller connected to the CPU core, the method comprising:

displaying at least first and second animated characters at respective display positions on a touch sensitive display;

detecting a single gesture traced on the touch sensitive display by a human user; and selecting, in response to said single gesture, whether to control said first and second animated characters to move individually or in tandem, including selecting individual movement of the first and second animated characters in response to a detected first single gesture tracing a first path relative to display positions of said displayed first and second animated characters, and selecting tandem movement of the first and second animated characters in response to a detected second single gesture tracing a second path relative to display positions of said displayed first and second animated characters that is distinguishable from the first path relative to display positions of said displayed first and second animated characters;

conditioning the selecting based on the starting position of the detected gesture path relative to the display positions of the first and second animated characters;

selecting movement direction of the selected animated character(s) based on direction of the detected gesture path; and moving the displayed first and second animated characters on the touch sensitive display individually or in tandem in the selected movement direction at least in part in accordance with the selection of individual or tandem movement.

2. The method of claim 1 further including selecting whether to flip the orientation of the first character in response to the detected gesture path before or during movement of the first character.

3. The method of claim 1 further including playing a video game using the first and second characters.

4. The method of claim 1 further including selecting whether to control the first and second characters to move in a common direction in response to the detected gesture path.

5. The method of claim 1 further including maintaining a spacing between the first and second characters as they move individually or in tandem.

6. The method of claim 1 further including selecting whether to control the first and second characters to move individually or as a group in response to the detected gesture.

7. The method of claim 1 further including selecting whether to control the first and second characters to move in different directions in response to the detected gesture path.

8. The method of claim 1 further including selecting the second game character for movement in response to collision between the first and second game characters.

\* \* \* \* \*